Aug. 12, 1952
C. H. BAKER
2,606,954
UNIVERSAL SINGLE INSULATOR MOUNTING FOR
HIGH-VOLTAGE ELECTRICAL DEVICES
Filed March 22, 1948
3 Sheets-Sheet 1
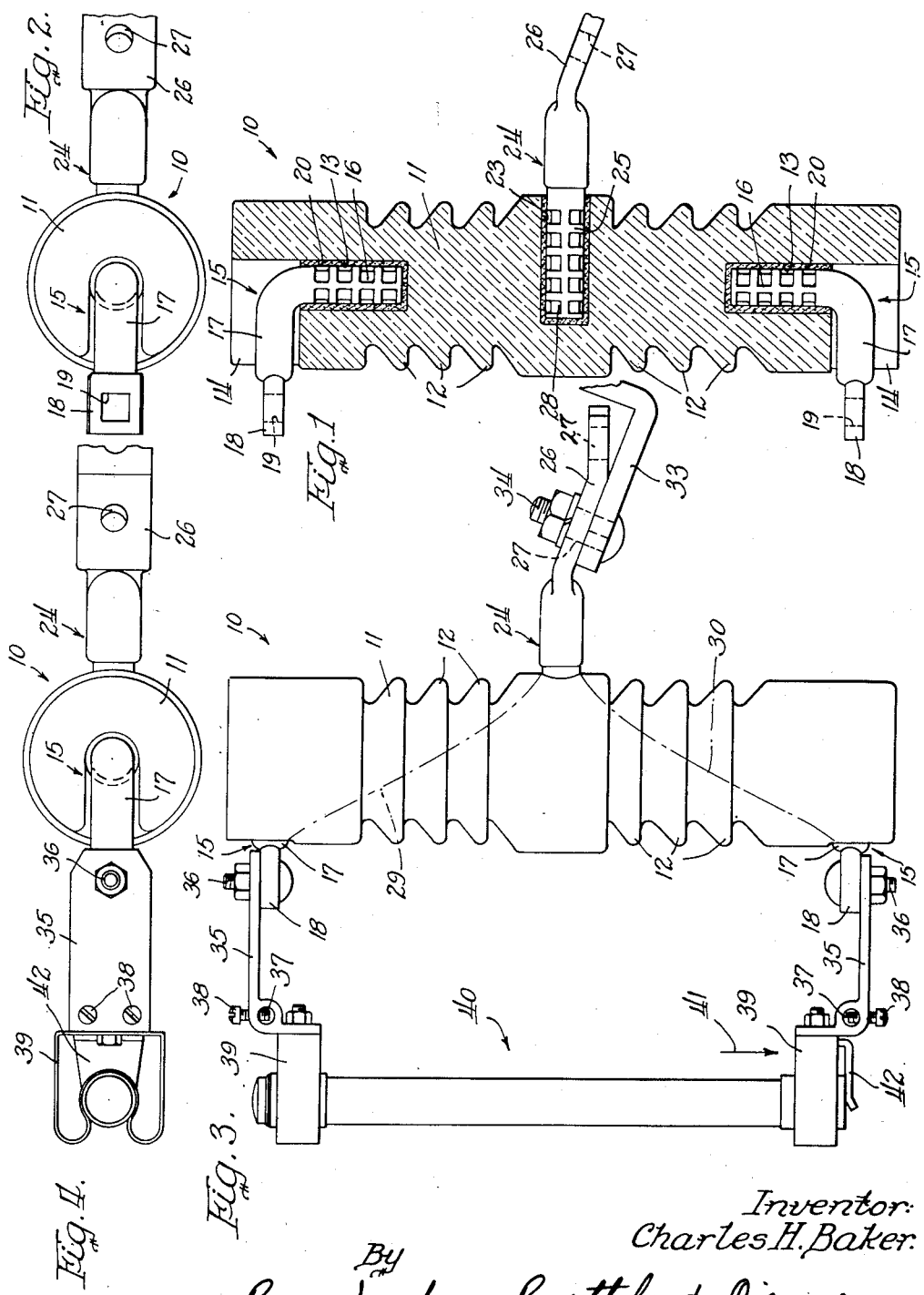
Inventor:
Charles H. Baker.
By Brown, Jackson, Boettcher & Dienner
Attys

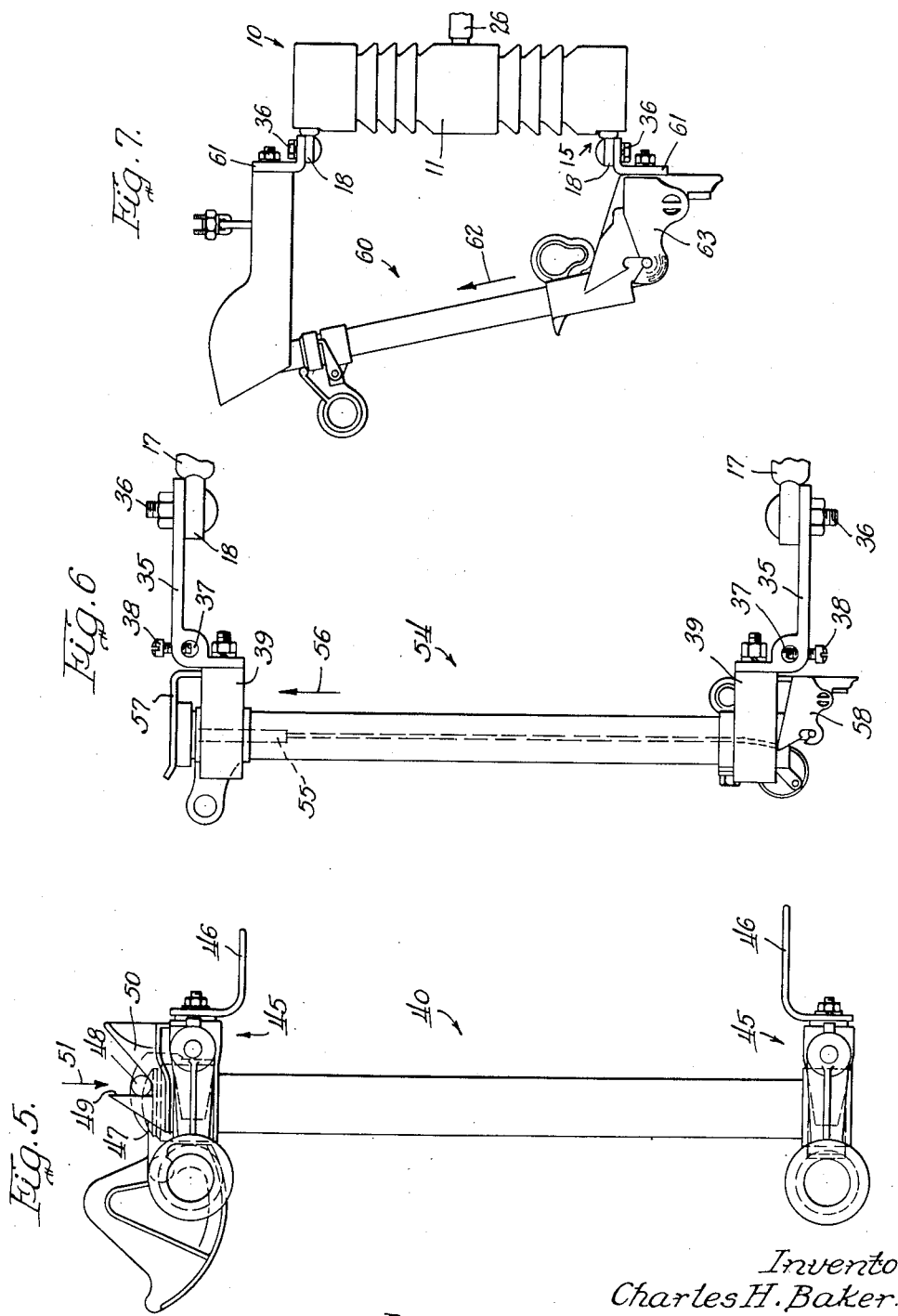

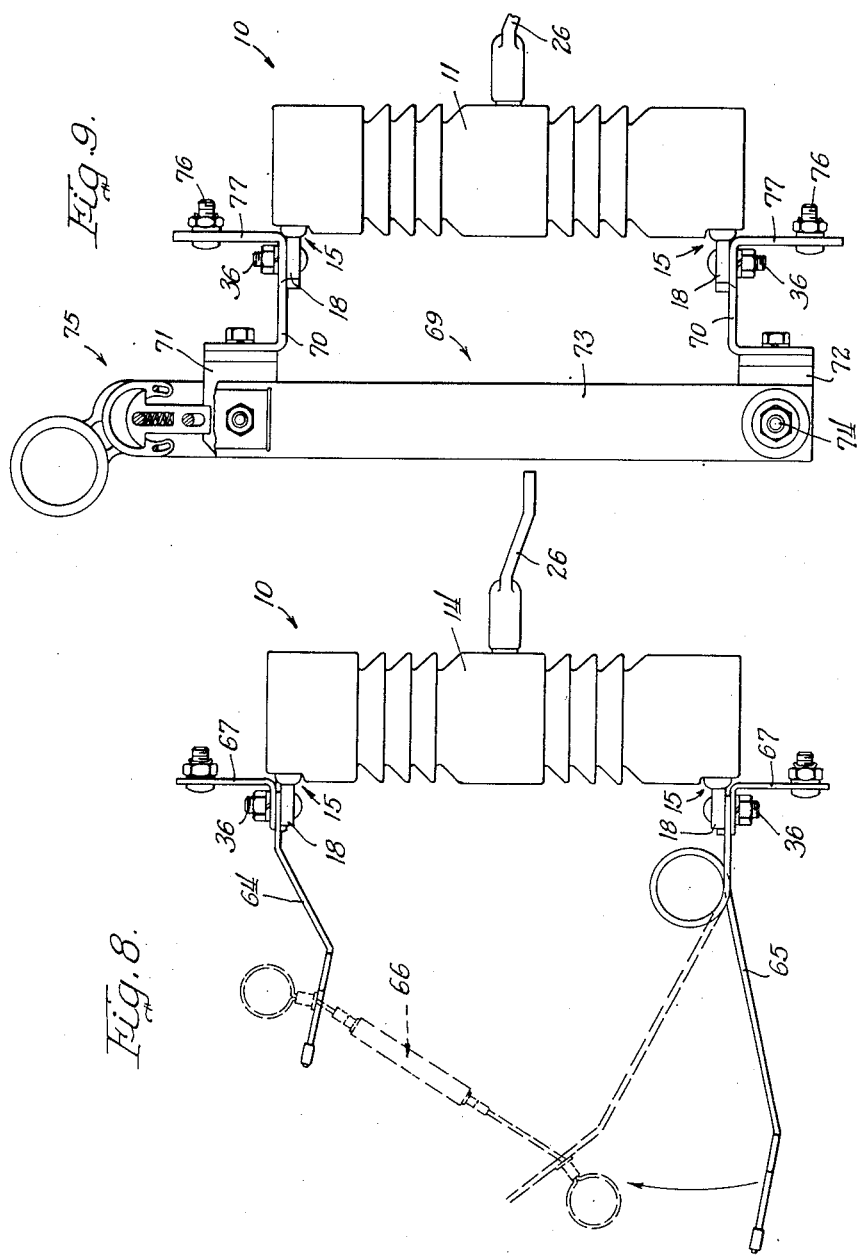

Patented Aug. 12, 1952

2,606,954

UNITED STATES PATENT OFFICE 2,606,954

UNIVERSAL SINGLE INSULATOR MOUNTING FOR HIGH-VOLTAGE ELECTRICAL DEVICES

Charles H. Baker, Maywood, Ill., assignor to S & C Electric Company, Chicago, Ill., a corporation of Delaware Application March 22, 1948, Serial No. 16,268

12 Claims. (Cl. 174—158)

This invention relates, generally, to insulated mountings for high voltage electrical devices and it has particular relation to such mountings that can be employed for supporting various types of high voltage electrical devices, such as fuses, disconnecting switches, lightning arresters, etc.

Among the objects of this invention are: To provide a universal single insulator mounting for various types of high voltage electrical devices which can be used without special adaptations for a wide range of such devices; to construct the mounting so that maximum use is made of the insulation between the brackets or inserts which support the electrical device and the bracket which supports the insulator and the full mechanical strength of the insulator is developed; to locate the brackets or inserts in the insulator so that a shorter length of insulator than that previously used can be employed while still maintaining the necessary line to line flashover conditions; to employ a solid cylindrical insulator of frangible material and to position the bracket which supports the insulator midway between the brackets or inserts that carry the electrical device so that the minimum electrical leakage and striking distances between the former and the latter are measured along helical paths of substantially equal lengths over the surface of the cylindrical insulator and at the same time the full mechanical strength of the frangible material is developed; to shape the brackets or inserts that carry the electrical device so that either is capable of resisting the cantilever load or shock which is an incident to the operation of the electrical device and which may be applied from various directions at the point of attachment of the brackets or inserts to the insulator; to distribute the cantilever load or shock advantageously throughout the full cross section of frangible insulator; to shape the brackets or inserts which support the electrical device so that some resiliency is provided between the points where each is attached to the device and where each is attached to the insulator; to construct the mounting so that a small bird or animal cannot roost or perch on the lower bracket or insert and touch the bracket which supports the insulator or on the latter bracket and touch the upper bracket or insert; and to arrange the inserts or brackets which support the electrical device so that they are generally symmetrically disposed from both a mechanical and an electrical standpoint with respect to the bracket which supports the insulator and in such positions that no part of the former can be viewed from any point on the latter.

Other objects of this invention will, in part, be obvious and in part appear hereinafter.

This invention is disclosed in the embodiment thereof shown in the accompanying drawings and it comprises the features of construction, combination of elements, and arrangement of parts which will be exemplified in the constructions hereinafter set forth and the scope of the application of which will be indicated in the appended claims.

For a more complete understanding of the nature and scope of this invention, reference can be had to the following detailed description, taken together with the accompanying drawings in which:

Figure 1 is a longitudinal vertical sectional view through a universal single insulator mounting for high voltage electrical devices that is constructed in accordance with this invention;

Figure 2 is a top plan view of the mounting shown in Figure 1;

Figure 3 is a view, in side elevation, of the mounting shown in Figure 1 arranged to carry a liquid fuse and to support the downward reaction thereof when it blows on the lower insert or mounting bracket;

Figure 4 is a top plan view of the construction shown in Figure 3;

Figure 5 shows a mounting for a liquid fuse which can be carried by the universal single insultor mounting illustrated in Figures 1 and 3, the liquid fuse being arranged to apply its downthrust to the upper insert or bracket of the insulator mounting;

Figure 6 shows how an expulsion type fuse device can be mounted on the universal single insulator mounting, the construction being such that the upward thrust of the fuse device on blowing is applied to the insert or bracket at the upper end of the insulator;

Figure 7 is a view, in side elevation, illustrating how a drop out expulsion type fuse device can be mounted on the universal single insulator mounting;

Figure 8 is a view, in side elevation, showing how an open type of fuse device can be mounted on the universal single insulator mounting; and Figure 9 is a view, in side elevation, illustrating how a disconnecting switch can be mounted on the universal single insulator mounting.

Referring now particularly to Figures 1 and 2 of the drawings, it will be observed that the reference character 10 designates, generally, a universal single insulator mounting which can be employed for supporting various types of fuses as will be described in detail hereinafter. In addition, the insulator mounting 10 can be employed for supporting disconnecting switches, lightning arresters, and the like, since the construction is such that it is capable of resisting cantilever load or shock at either end from any direction. The particular insulator mounting 10 is common to all of these devices. Because of this it is possible to reduce the number of different items which must be carried in stock by the electrical manufacturer and the utility with obvious economies being effected from various standpoints.

The insulator mounting 10 comprises a solid cylindrical insulator 11 of frangible material, such as porcelain. The insulator 11 has corrugations 12 to increase the leakage and striking distance over its surface.

At each end of the insulator 11 there is a longitudinal centrally located cavity 13 which is intersected by a transverse slot 14, the slots 14 being parallel. In effect, the cavity 13 and slot 14 at each end provide an L-shaped opening for receiving L-shaped metallic mounting brackets or inserts which are indicated, generally, at 15. Each of the brackets or inserts 15 includes an arm 16 which extends into the associated cavity 13. The arm 16 is cylindrical and corrugated as shown to resist both longitudinal and torsional forces. The bracket or insert 15 also includes an arm 17 which extends at right angles to the arm 16 and, as shown, is positioned in the transverse slot 14 so that the arms 17 are parallel to each other and extend radially outwardly from the insulator 11 in the same direction. The outer end of each of the arms 17 is provided with a flattened pad 18 for receiving a suitable bracket which carries the electrical device that is to be mounted on the insulating mounting 10. It will be noted that the pad 18 has a rectangular opening 19 for receiving a carriage bolt and preventing the same from turning.

It will be observed that the arm 16 of the bracket 15 at each end of the insulator 11 is secured in place by cement 20. The cement 20 may be a lead-antimony alloy or it may be sulphur or Portland cement as may be desired.

It will be observed that the arms 17 of the brackets or inserts 15 are spaced from the walls of the slots 14. They are somewhat resilient and thus provide a certain degree of resiliency between the pads 18 where the electrical device is fastened and the arms 16 which are cemented into the insulator 11. This construction facilitates dissipation of the shock incident to the operation of the electrical device, such as the blowing of a fuse.

Midway between the ends of the insulator 11 is a cavity 23 which is parallel to the transverse slots 14 and opens diametrically oppositely thereto. The cavity 23 is provided for receiving a metallic support bracket that is indicated, generally, at 24. The bracket 24 has a cylindrical section 25 which is corrugated as shown. The bracket 25 also has a mounting section 26 with rectangular openings 27 for receiving carriage bolts for fastening to a cross arm bracket or the like.

The bracket 24 is secured in the cavity 23 by a suitable cement 28 in the same manner that the brackets or inserts 15 are secured in the end cavities 13.

It will be observed that the construction of the insulating mounting 10 which has been described above is such as to position the support bracket 24 which carries the insulator 11 both mechanically and electrically symmetrically with respect to the brackets or inserts 15 at the ends. From a mechanical standpoint this is advantageous since it is unnecessary to pay particular attention to the end of the insulator mounting 10 which is to take the cantilever load or shock which results from the operation of the circuit interrupter carried thereby. This will be described in more detail hereinafter.

From an electrical standpoint, it will be noted that the minimum electrical leakage and striking distances between the support bracket 24 and the mounting brackets or inserts 15 are along the helical paths 29 and 30 over the surface of the insulator 11 as shown in Figure 3. Moreover, no point on either of the brackets or inserts 15 can be viewed from any point along the support bracket 24. Thus, from an electrical standpoint, maximum use is made of the insulation between the support bracket 24 and the mounting brackets or inserts 15. This is particularly important when it is recalled that the support bracket 24 is considered to be at ground potential while the mounting brackets or inserts 15 are at line potential. When the particular construction shown in Figures 1 and 3 and described hereinbefore is employed, the size of the insulator 11 for a given system voltage can be reduced to a minimum while maintaining the required line to line insulation.

Another advantage of the construction above described is that a small bird or animal roosting or perching on the lower mounting bracket or insert 17 or parts electrically connected thereto cannot reach or touch the support bracket 24. Likewise if the small bird or animal roosts or perches on the support bracket 24 it cannot reach or touch the upper mounting bracket or insert 15. Thus there is little likelihood of an accidental ground being caused by a small bird or animal roosting on or near parts of the insulator mounting 10 as may be the case in other insulator mountings of the prior art.

By positioning the arms 16 of both of the brackets or inserts 15 along the longitudinal axis of the porcelain insulator 11 instead of transversely thereto the cantilever load or shock applied to the outer ends of the arms 17 is distributed throughout the entire cross section of the insulator 11. Thus a minimum diameter of insulator 11 can be used and its full strength is developed.

For illustrative purposes it is pointed out that the insulator 11 may have a maximum diameter of three inches and a length of eleven and one-half inches. The support bracket 24 is located midway between the ends of the insulator 11. The cavities 13 and 23 may have a diameter of thirteen-sixteenths inch and the portions of the brackets 15 and 24 inserted therein may have a maximum diameter of five-eighths inch. The foregoing dimensions apply to only a single size of insulator mounting 10 which has been constructed. It will be understood that other dimensions are employed for insulator mountings for different sizes and voltage applications. However, for a given voltage rating the construction of the insulator mounting 10 will be the same in accordance with this invention for carrying various types of electrical devices as will be described presently.

In Figures 3 and 4 of the drawings there is illustrated one manner in which the insulator mounting 10 can be employed. It will be noted that an arm 33 of a cross arm mounting bracket may be secured to the mounting section 26 of the support bracket 24 by a carriage bolt 34 in either of two positions. Suitable fittings 35 are secured by carriage bolts 36 to the pads 18 of the L-shaped mounting brackets or inserts 15, and they project radially outwardly from the insulator 11 in continuation of the arms 17. The fittings 35 have apertures 37 for receiving line conductors which are fastened in place by clamp screws 38 to provide the desired electrical connection. Fuse clips 39 are carried by the outer ends of the fittings 35 for supporting a liquid fuse, indicated generally at 40, of a type now well known in the art. For example, the liquid fuse construction shown in Patent No. 2,091,430, assigned to the assignee of this application, may be employed.

When the liquid fuse 40 blows, the reaction is downwardly as indicated by the arrow 41. In order to prevent the liquid fuse 40 from being blown out of the fuse clip 39, a stop member 42 is carried by the lower fitting 35 and abuts the lower end of the liquid fuse 40. Thus the downward thrust in the direction of the arrow 41 is applied to the lower mounting bracket or insert 15 and the cantilever shock incident to the blowing of the fuse 40 is taken by the lower end of the insulator mounting 10.

Referring now particularly to Figure 5 of the drawings it will be observed that a liquid fuse 40, of the construction previously described, is provided for mounting on the universal single insulator mounting 10 in such manner that the reaction on blowing is taken by the upper metallic bracket or insert 15, previously described, instead of the lower one. The liquid fuse 40 may be clamped into the circuit by clamp contact clips 45 of the type described in Patent No. 2,147,316. The clips 45 are carried at the outer ends of fittings 46 which, it will be understood, are secured by the bolts 36, Figure 3, to the pads 18 of the mounting brackets or inserts 15 at the ends of the insulator 11. A suspension clamp 47 is secured to the upper terminal of the liquid fuse 40 and it has oppositely extending trunnions 48 which interfit with notches 49 in a suspension bracket 50 that is carried by the upper fitting 46. The construction is such that, when the fuse 40 blows, its reaction is downward as indicated by the arrow 51 but, in the construction here shown, this reaction is taken by the upper fitting 46 at the upper end of the insulator 11. Thus it will be seen that the same universal single insulator mounting 10 can be employed for fuses, such as liquid fuses, which react downwardly with the reaction being applied against either the upper or the lower end of the mounting 10 as desired. It is unnecessary to make special provision in the construction of the mounting 10 for reaction at one end or the other since the construction inherently is identical.

In Figure 6 of the drawings there is illustrated, generally, at 54 an expulsion type of fuse tube in which may be located a universal expulsion fuse link 55. When the fuse link 55 blows, the fuse tube 54 discharges downwardly and the reaction is upwardly as indicated by the arrow 56. A stop member 57, carried by the fitting 35 at the upper end of the universal single insulator mounting 10, serves to hold the expulsion fuse tube 54 in place and to take the reaction incident to the fuse operation. In general the construction shown in Figure 6, insofar as the mounting for the fuse is concerned, is similar to the construction shown in Figure 3 except that the stop member 57 is carried at the upper end of the universal single insulator mounting 10 rather than at the lower end. In addition, a hinge member 58 is provided for receiving the expulsion fuse tube 54 at the lower end of the mounting 10 in a manner analogous to that shown in Patent No. 2,247,700.

In Figure 7 of the drawings there is illustrated a drop out fuse construction at 60 which is in accordance with the construction shown in said Patent No. 2,247,700. The drop out fuse 60, as shown, is mounted on the universal single insulator mounting 10 by suitable L-shaped fittings 61 which are secured to the pads 18 by the carriage bolts 36. When the drop out fuse 60 blows, its reaction initially is in an upward direction as indicated by the arrow 62. In this construction this reaction is taken by a hinge bracket 63 that is carried by the mounting 10 at its lower end. Subsequently, the fuse 60 drops out and swings downwardly. It is stopped, as described in this patent, by a rubber bumper on the hinge bracket 63. The cantilever shock resulting either from the blowing of the fuse 60 or its being arrested in its swinging movement by the bumper on the bracket 63, the former being generally upwardly and the latter being generally radially inwardly of the insulator 11, is taken by the bracket or insert 15 at the lower end of the insulator 11 and distributed over its entire cross section as described.

In Figure 8 of the drawings still another form of fuse device is illustrated as being mounted on the universal single insulator mounting 10. The fuse device here is of the open type and comprises upper and lower arms 64 and 65 which are formed of wire and are arranged to be biased apart. The arms 64 and 65 are arranged to be interconnected by an open type fuse link 66 which may be constructed as shown in Patent No. 2,324,044. It will be observed that the upper and lower arms 64 and 65 are secured to the pads 18 of the brackets or inserts 15 by the carriage bolts 36. These carriage bolts 36 also serve to hold L-shaped line terminals 67 in engagement with the arms 64 and 65 to provide for electrical connection thereto.

In Figure 9 there is illustrated, generally, at 69 a disconnecting switch which can be mounted on the universal single insulator mounting 10. The disconnecting switch 69 is carried by a pair of U-shaped fittings 70 which are secured by the carriage bolts 36 to the pads 18 of the brackets or inserts 15 at the ends of the mounting 10. One arm of each of the fittings 70 is arranged to carry the adjacent upper or lower switch jaw 71 or 72, as shown. A switch blade 73 is hinged at 74 to the lower switch jaw 72. A suitable locking mechanism 75 is provided for locking the switch blade 73 in the switch closed position where it is in engagement with the upper switch jaw 71. Connector bolts 76 of conventional U-shape interfit with arms 77 of the fitting 70 to provide for connection of line conductors thereto and to the switch jaws 71 and 72 as will be understood readily.

From the foregoing description it will be apparent that the universal single insulator mounting 10 is adapted, without change, for supporting various types of fuse devices. Also it can be employed for supporting a disconnecting switch. It will be apparent that it can be employed for supporting other high voltage electrical devices such as lightning arresters, metering equipment, and the like. Moreover, because of the particular arrangement and construction of the brackets or inserts 15 and 24 the various features and advantages enumerated hereinbefore are obtained.

Since certain changes can be made in the foregoing universal single insulator mounting without departing from the spirit and scope thereof, it is intended that all matter shown in the accompanying drawings and described hereinbefore shall be interpreted as illustrative and not in a limiting sense.

What is claimed as new is:

1. A single insulator mounting for high voltage electrical devices comprising, in combination, a one piece cylindrical insulator of frangible material with a radial slot in each end, a mounting bracket extending radially outwardly in each slot at each end of said insulator for carrying the electrical device, said mounting brackets extending in the same direction generally parallel to each other, and a support bracket extending radially outwardly from the interior of said insulator intermediate its ends in a direction opposite to that in which said mounting brackets extend, the sides of said slots acting to increase the electrical creepage distances between said mounting brackets and said support bracket.

2. A single insulator mounting for high voltage electrical devices comprising, in combination, a one piece cylindrical insulator of frangible material, an L-shaped mounting bracket for each end of said insulator, one arm of each bracket being cemented into its end of said insulator, the other arms of said brackets extending radially outwardly from said insulator in parallel relation for carrying the electrical device, and a support bracket cemented into said insulator intermediate its ends and extending radially outwardly in a direction opposite to that in which said other L-shaped mounting brackets extend.

3. A universal single insulator mounting for high voltage circuit interrupting devices such as fuses, disconnecting switches, and lightning arresters comprising, in combination, a generally cylindrical solid insulator of frangible material having an axially extending cavity in each end with parallel transverse slots extending radially into the same at said ends, a generally L-shaped metal insert for each end of said insulator, one arm of each insert being cemented into the corresponding end cavity and the other arm of each insert extending radially outwardly through the corresponding slot to receive various types of circuit interrupters reacting in one direction or the other generally parallel to the longitudinal axis of said insulator, and a metal support bracket extending radially outwardly from the interior of said insulator midway between its ends in a direction opposite to said other arms.

4. A universal single insulator mounting for high voltage circuit interrupting devices such as fuses, disconnecting switches, and lightning arresters comprising, in combination, a generally cylindrical solid insulator of frangible material having an axially extending cavity at each end with parallel transverse slots extending radially into the same at said ends and a cavity intermediate said ends extending from the side opposite said parallel transverse slots transversely of the longitudinal axis of said insulator, a generally L-shaped metal insert for each end of said insulator, one arm of each insert being cemented into the corresponding end cavity and the other arm of each insert extending radially outwardly through the corresponding slot to receive various types of circuit interrupters reacting in one direction or the other generally parallel to said longitudinal axis, and a metal support bracket having one end cemented in said intermediate cavity and extending from said insulator on the side opposite said circuit interrupter mounting means whereby no uninsulated energized part is directly below or above said support bracket.

5. A single insulator mounting for high voltage electrical devices comprising, in combination, a one piece solid cylindrical insulator of frangible material with a radial slot in each end, a metallic mounting bracket at each end of said insulator extending radially outwardly in said slot thereat for carrying the electrical device, said mounting brackets extending in the same direction generally parallel to each other, and a metallic support bracket extending radially outwardly from the interior of said insulator in a direction opposite to that in which said mounting brackets extend, the sides of said slots acting to increase the electrical creepage distances between said mounting brackets and said support brackets, said support bracket being located midway between said mounting brackets in such position that the minimum electrical leakage and striking distances between the former and the latter are measured along helical paths of substantially equal length over the surface of said insulator.

6. A universal single insulator mounting for high voltage circuit interrupting devices such as fuses, disconnecting switches, and lightning arresters comprising, in combination, a generally cylindrical solid insulator of frangible material having an axially extending cavity at each end with parallel transverse slots extending radially into the same at said ends and a cavity intermediate said ends extending from the side opposite said parallel transverse slots transversely of the longitudinal axis of said insulator, a generally L-shaped metal insert for each end of said insulator, one arm of each insert being cemented into the corresponding end cavity and the other arm of each insert extending radially outwardly through the corresponding slot to receive various types of circuit interrupters reacting in one direction or the other generally parallel to said longitudinal axis, and a metal support bracket having one end cemented in said intermediate cavity and extending from said insulator on the side opposite said circuit interrupter mounting means whereby no uninsulated energized part is directly below or above said support bracket, said metal support bracket being located midway between said L-shaped metal inserts in such position that the minimum electrical leakage and striking distances between the former and the latter are measured along helical paths of substantially equal length over the surface of said insulator.

7. A single insulator mounting for high voltage electrical devices comprising, in combination, a one piece cylindrical insulator of frangible material, an L-shaped metallic mounting bracket at each end of said insulator, each bracket having one arm cemented into its end of said insulator along the longitudinal axis thereof and the other arm extending radially outwardly of said insulator through a transverse slot therein, and a metallic support bracket extending radially outwardly from the interior of said insulator midway between its ends in a direction opposite to said other arms.

8. A single insulator mounting for high voltage electrical devices comprising, in combination, a one piece cylindrical insulator of frangible material, an L-shaped metallic mounting bracket at each end of said insulator, each bracket having one arm cemented into its end of said insulator along the longitudinal axis thereof and the other arm extending radially outwardly of said insulator through a transverse slot therein, the radially extending arm of each L-shaped mounting bracket being spaced from its transverse slot and providing a resilient mounting for the device between its outer end and the arm cemented into said insulator, and a metallic support bracket extending radially outwardly from the interior of said insulator midway between its ends in a direction opposite to said other arms.

9. A single insulator mounting for various types of high voltage electrical devices comprising, in combination, a one piece cylindrical insulator of frangible material with a radial slot in each end, a mounting bracket extending radially outwardly in each slot at each end of said insulator for carrying the electrical device, said mounting brackets extending in the same direction generally parallel to each other, and a support bracket extending radially outwardly from the interior of said insulator intermediate its ends in a direction opposite to that in which said mounting brackets extend, the sides of said slots acting to increase the electrical creepage distance between said mounting brackets and said support bracket, said mounting brackets being of such dimensions and so located that no part of either of them can be viewed from any point on said support bracket.

10. A single insulator mounting for high voltage electrical devices comprising, in combination, a one piece cylindrical insulator of frangible material, an L-shaped metallic mounting bracket at each end of said insulator, each bracket having one arm cemented into its end of said insulator along the longitudinal axis thereof and the other arm extending radially outwardly of said insulator through a transverse slot therein, said other arms being adapted to carry circuit interrupter mounting means at the outer end of each and to load the same in cantilever fashion with the resultant forces being transmitted substantially uniformly over the entire cross section of said insulator by said arms located along its longitudinal axis, and a metallic support bracket extending radially outwardly from the interior of said insulator midway between its ends in a direction opposite to said other arms.

11. A single insulator mounting for high voltage electrical devices comprising, in combination, a one piece cylindrical insulator of frangible material having at each end an endwise opening slot extending radially from the central portion of said insulator, a mounting bracket extending radially outwardly in each slot at each end of said insulator for carrying the electrical device, said mounting brackets extending in the same direction generally parallel to each other, and a support bracket extending radially outwardly from the interior of said insulator intermediate its ends in a direction opposite to that in which said mounting brackets extend, the sides and ends of said slots acting to increase the electrical creepage distances between said mounting brackets and said support bracket.

12. A single insulator mounting for high voltage electrical devices comprising, in combination, a one piece cylindrical insulator of frangible material, an L-shaped metallic mounting bracket at each end of said insulator, each bracket having one arm cemented into its end of said insulator along the longitudinal axis thereof and the other extending radially outwardly of said insulator through a transverse slot therein, said other arms of said L-shaped mounting brackets extending in the same direction and each being adapted to carry circuit interrupter mounting means, and bracket means secured to said insulator intermediate its ends and having a part extending therefrom in a direction opposite to that in which said arms extend radially for mounting said insulator on a support.

CHARLES H. BAKER.

REFERENCES CITED

The following references are of record in the file of this patent:

UNITED STATES PATENTS

| Number | Name | Date |
|---|---|---|
| 880,418 | Summerscales | Feb. 25, 1908 |
| 1,059,903 | Petterson | Apr. 22, 1913 |
| 1,651,704 | Hendee | Dec. 6, 1927 |
| 1,707,479 | Jacobs | Apr. 2, 1929 |
| 1,925,624 | Boll | Sept. 5, 1933 |
| 2,028,421 | Steinmayer | Jan. 21, 1936 |
| 2,118,646 | Hermann | May 24, 1938 |
| 2,170,698 | Smith | Aug. 22, 1939 |
| 2,354,907 | Bennett et al. | Aug. 1, 1944 |
| 2,361,240 | Rawlins et al. | Oct. 24, 1944 |